(No Model.)

G. W. KELLY.
BRAKE ROD FORK.

No. 510,267.  Patented Dec. 5, 1893.

WITNESSES:
H. McArdle.
C. Sedgwick.

INVENTOR
G. W. Kelly
BY
Munn & Co
ATTORNEYS.

UNITED STATES PATENT OFFICE.

GEORGE W. KELLY, OF MARQUETTE, MICHIGAN.

BRAKE-ROD FORK.

SPECIFICATION forming part of Letters Patent No. 510,267, dated December 5, 1893.

Application filed May 17, 1893. Serial No. 474,567. (No model.)

*To all whom it may concern:*

Be it known that I, GEORGE W. KELLY, of Marquette, in the county of Marquette and State of Michigan, have invented a new and Improved Brake Fork or Jaw, of which the following is a full, clear, and exact description.

My invention relates to an improvement in brake forks or jaws, and especially to brake forks used in connection with the brake rods of railway or street cars, and the object of the invention is to construct a brake fork in a much more economic and expeditious manner than heretofore, and also to so construct the fork that in the event the shank should break, for example, close to the fork, another shank may be introduced in a convenient and expeditious manner.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
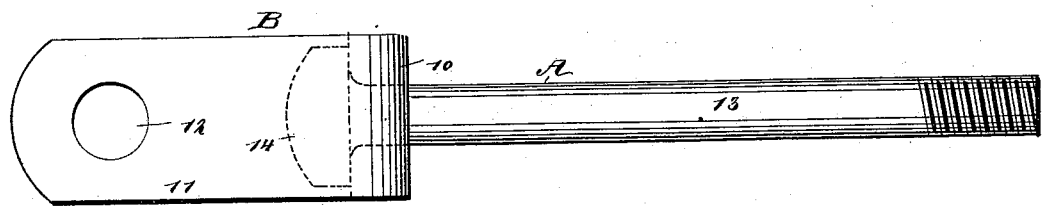
Figure 2:
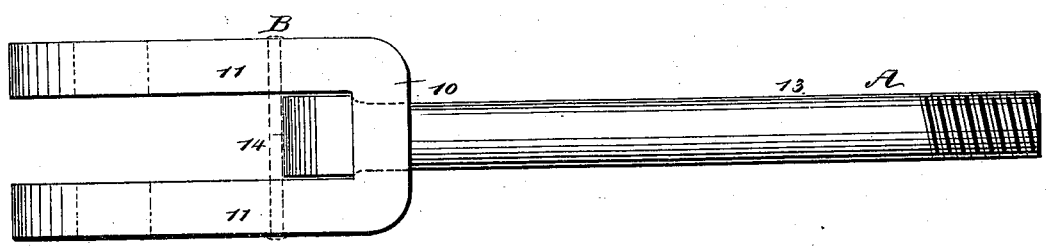
Figure 3:
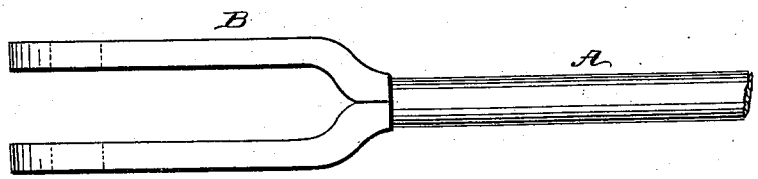

Figure 1 is a side elevation of the improved brake fork or jaw. Fig. 2 is a plan view thereof; and Fig. 3 is a plan view of the brake fork or jaw as at present constructed.

In carrying out the invention, the shank A is in a measure independent of the jaw or fork B. In this lies the main feature of the invention, as will be observed by reference to Fig. 3. In forks of the ordinary construction the shank and fork are either made integral, or the two are welded or otherwise firmly secured together.

In the old form of fork, the members or tines of the fork are welded together at one end, and the metal is then drawn out at the united ends of the tines to form the same. In the event that the stem should break when the fork is constructed in the above manner, and the fracture should be close to the fork, it is impossible to readily repair the fork, as a new stem must be welded to the fork, or otherwise made an integral portion of it.

In the improved form the fork B, is made of one piece of metal, which may be malleable iron or soft steel, and the metal is bent practically to a U-shape, forming thereby a body 10 and opposing or parallel tines 11, which tines are provided with the usual opening 12, to receive a bolt or pivot pin.

The body portion 10 of the fork is provided with an opening extending through from its inner to its outer face, and through this opening a round metal rod 13 of suitable diameter is passed to form the stem, the outer portion of the rod being threaded in the ordinary way. After the rod has been passed through the opening in the body a head 14, is formed upon the inner end of the rod by means of an ordinary bolt header or like tool. In this manner the stem and the fork are connected, and one cannot leave the other.

In the event the stem should break, it may be readily replaced by a second stem having a head already formed thereon; and I desire it to be understood that the headed stem may be passed through an aperture in the body portion 10 of the fork prior to the metal of which the fork is made, being bent to proper shape.

When the fork or jaw is to be used in connection with top and bottom brake rods, the shank may be held in the fork by means of a rivet as shown in dotted lines in Fig. 2.

Having thus described my invention, I claim as new and desire to secure by Letters Patent—

1. As an improved article of manufacture, a brake fork or jaw, the same consisting of a fork and a stem passed through the body of the fork and headed between the tines thereof, as and for the purpose set forth.

2. A brake fork or jaw, the stem of which is independent of the fork, as and for the purpose set forth.

3. A brake jaw or fork having its stem passed through the body and provided with a head engaging with the inner body surface of the fork, as set forth.

GEORGE W. KELLY.

Witnesses:
J. S. MCCARTHY,
G. M. SACKRIDER.